United States Patent
Jiao et al.

(10) Patent No.: US 12,247,887 B2
(45) Date of Patent: Mar. 11, 2025

(54) STRUCTURAL HEALTH MONITORING SYSTEM BASED ON SHAPE MEMORY POLYMER

(71) Applicant: ZHEJIANG UNIVERSITY, Zhejiang (CN)

(72) Inventors: Pengcheng Jiao, Zhejiang (CN); Xiaoxiao Cui, Zhejiang (CN); Tao Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 691 days.

(21) Appl. No.: 17/611,572

(22) PCT Filed: Apr. 25, 2021

(86) PCT No.: PCT/CN2021/089507
§ 371 (c)(1),
(2) Date: Nov. 16, 2021

(87) PCT Pub. No.: WO2021/227841
PCT Pub. Date: Nov. 18, 2021

(65) Prior Publication Data
US 2022/0307911 A1    Sep. 29, 2022

(30) Foreign Application Priority Data
May 11, 2020    (CN) .......................... 202010393267.7

(51) Int. Cl.
*G01K 5/48*    (2006.01)
*G01B 7/16*    (2006.01)

(52) U.S. Cl.
CPC .............. *G01K 5/483* (2013.01); *G01B 7/16* (2013.01)

(58) Field of Classification Search
None
See application file for complete search history.

(56) References Cited

U.S. PATENT DOCUMENTS 4,625,137 A * 11/1986 Tomono ............... H10N 30/802
                                                      310/317
7,204,472 B2    4/2007 Jones et al.
(Continued)

FOREIGN PATENT DOCUMENTS

| CN | 101689879 | 3/2010 |
| CN | 101782053 | 7/2010 |

(Continued)

OTHER PUBLICATIONS

"International Search Report (Form PCT/ISA/210) of PCT/CN2021/089507" mailed on Jul. 28, 2020, pp. 1-6.
(Continued)

*Primary Examiner* — Erica S Lin
(74) *Attorney, Agent, or Firm* — JCIP GLOBAL INC.

(57) ABSTRACT

A structural health monitoring system based on a shape memory polymer includes a plurality of shape memory polymer buckling beam rod components, and a signal processing and structural health state abnormity warning platform. Each shape memory polymer buckling beam rod component includes an outer frame constraint, a shape memory polymer rod, and an electric signal generating element. The electric signal generating element includes piezoelectric material layers, and the signal processing and structural health state abnormity warning platform is electrically connected to the piezoelectric material layers.

7 Claims, 4 Drawing Sheets

(56) References Cited

U.S. PATENT DOCUMENTS

| | | | |
|---|---|---|---|
| 7,550,189 B1 | 6/2009 | McKnight et al. | |
| 2009/0181636 A1* | 7/2009 | Fulks, III | G01R 19/2506 455/334 |
| 2009/0206532 A1* | 8/2009 | Mayer | F16F 15/005 267/140.14 |
| 2012/0216945 A1* | 8/2012 | Xie | B32B 37/144 156/163 |
| 2019/0248298 A1 | 8/2019 | Barnes et al. | |

FOREIGN PATENT DOCUMENTS

| | | |
|---|---|---|
| CN | 103608656 | 2/2014 |
| CN | 106522805 | 3/2017 |
| CN | 111551269 | 8/2020 |

OTHER PUBLICATIONS

"Written Opinion of the International Searching Authority (Form PCT/ISA/237) of PCT/ CN2021/089507," mailed on Jul. 28, 2020, pp. 1-4.

* cited by examiner

STRUCTURAL HEALTH MONITORING SYSTEM BASED ON SHAPE MEMORY POLYMER

CROSS-REFERENCE TO RELATED APPLICATION

This application is a 371 of international application of PCT application serial no. PCT/CN2021/089507, filed on Apr. 25, 2021 which claims the priority benefit of China application no. 202010393267.7, filed on May 11, 2020. The entirety of each of the above mentioned patent applications is hereby incorporated by reference herein and made a part of this specification.

TECHNICAL FIELD

The present invention belongs to the technical field of structural health monitoring, and in particular relates to a structural health monitoring system based on a shape memory polymer.

DESCRIPTION OF RELATED ART

In engineering practice, a structure often bears various coupling loads under extreme working conditions, functional failure and damage occur frequently, and therefore analysis and monitoring for the health condition of the structure are of great significance for guaranteeing normal service of the structure. Particularly, when external environment changes (such as the environment temperature changes), the structure usually bears local or overall deformation, which causes unpredictable influence on the safety of the structure. Due to the fact that temperature strain has remarkable influence on structural safety and durability, structure temperature health monitoring has become an important link which cannot be ignored in the field of structural health monitoring. In an existing temperature health monitoring technology, a function of a temperature sensor crystal oscillator is usually achieved by utilizing a material characteristic that the frequency of the temperature sensor crystal oscillator changes along with the temperature, however, continuous supply of an external power source is needed, and the anti-interference performance and durability of the device have great defects, thus a health monitoring demand of a high-safety and high-reliability structure cannot be met for a long time.

The shape memory polymer is an intelligent material, which can generate different deformations under the stimulus of various environment factors, such as heat, light, ultrasonic, chemical substances, and the like, when exposed to an external environment. The shape memory polymer has the advantage that the temperature change can be responded in real time, and the response is editable. The shape memory polymer material is applied to the structural health monitoring technology based on the material property that the shape memory polymer material can generate a thermal excitation memory deformation at a specific temperature, and kinetic energy and potential energy of deformation of the shape memory polymer material are converted into electric signals through a piezoelectric material layer, thus achieving monitoring and early warning of abnormal temperature changes of the structure.

Compared with the prior art, the shape memory polymer structural health detection method does not need an external power supply for driving, has high device stability and reliability, and good editability. A target design adjustment can be made based on demands of different structural designs and engineering applications, and by taking a shape memory material temperature change response as an implementation method for structural health temperature monitoring, the industrial problems such as high reliability, durability requirements and the like of the structural health monitoring can be solved by combining a specific rod group structure. Compared with the prior art, the shape memory polymer structural health detection system converts a low-frequency environment temperature into a high-frequency buckling response of a variable-frequency beam to effectively excite the piezoelectric material layer to generate a monitoring current, thus inverting the environment temperature change. Compared with the prior art, the shape memory polymer structural health detection system utilizes a variety of materials and geometric dimension designs to form monitoring unit assemblies, and the design of a flexible structure is achieved by linking different assemblies through flexible material flat cables, which can achieve the requirements of the specific structure design, and adapt to complex and diverse structural health monitoring demands at the same time, and the practicability of the design is greatly improved.

SUMMARY

For the problem in an existing structural health monitoring scheme, the present invention provides a structural health monitoring system based on a shape memory polymer.

The structural health monitoring system based on the shape memory polymer comprises a plurality of shape memory polymer buckling beam rod components, and a signal processing and structural health state abnormity warning platform. Each shape memory polymer buckling beam rod component comprises an outer frame constraint, a shape memory polymer rod arranged in the outer frame constraint, and an electric signal generating element arranged on the shape memory polymer rod. The electric signal generating element comprises piezoelectric material layers covering surfaces of the shape memory polymer rod. The signal processing and structural health state abnormity warning platform is electrically connected to the piezoelectric material layers.

The structural health monitoring system based on the shape memory polymer is provided, wherein the signal processing and structural health state abnormity warning platform is provided with an analog-to-digital converter, a micro controller, and a warning flasher.

The structural health monitoring system based on the shape memory polymer is provided, wherein the shape memory polymer rod can generate a respective deformation along with change of temperature.

The structural health monitoring system based on the shape memory polymer is provided, wherein the shape memory polymer rod can generate buckling by an axial pressure under the action of the outer frame constraint after temperature deformation, thus becoming a shape memory polymer buckling beam.

The structural health monitoring system based on the shape memory polymer is provided, wherein the shape memory polymer buckling beam can generate post-buckling along with continuous change of temperature, thus becoming a shape memory polymer post-buckling beam.

The structural health monitoring system based on the shape memory polymer is provided, wherein the piezoelectric material layer covers both sides of the shape memory polymer rod, and the lengths of the piezoelectric material layers cover every position where the shape memory polymer rod is in contact with the outer frame constraint when the shape memory polymer rod generates the post-buckling change.

The structural health monitoring system based on the shape memory polymer is provided, wherein the electric signal generating element further comprises wires connected to the piezoelectric material layers in a matched mode, and the wires are connected to the signal processing and structural health state abnormity warning platform.

The structural health monitoring system based on the shape memory polymer is provided, wherein the electric signal generating element converts kinetic energy released by buckling and post-buckling changes of the shape memory polymer rod into electric signals and transmits the electric signals to the signal processing and structural health state abnormity warning platform.

DESCRIPTION OF THE EMBODIMENTS

Figure 1:
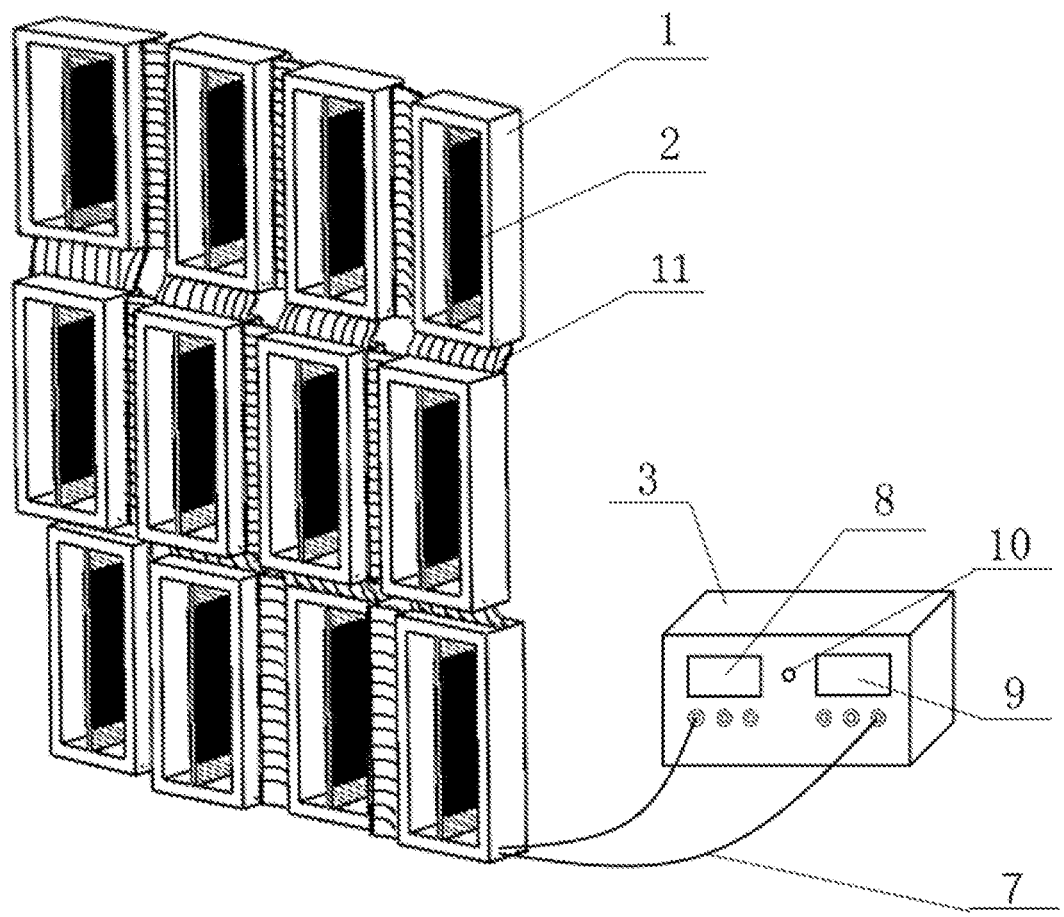
FIG. 1 is a structure diagram in accordance with the present invention.

As shown in the figures, a structural health monitoring system based on a shape memory polymer is provided. The structural health monitoring system comprises shape memory polymer buckling beam rod components 1, an electric signal generating element 2, and a signal processing and structural health state abnormity warning platform 3. Each shape memory polymer buckling beam rod component 1 comprises an outer frame constraint 5 and a shape memory polymer rod 4 arranged in the outer frame constraint 5. The outer frame constraint 5 is of a box-shaped structure, and two ends of the shape memory polymer rod 4 are fixed to an inner side of the outer frame constraint 5. The electric signal generating element 2 is composed of piezoelectric material layers 6 and wires 7 connected to the piezoelectric material layers 6 in a matched mode, and the structural health state abnormity warning platform 3 is connected to the wires 7.

Further, the signal processing and structural health state abnormity warning platform 3 is provided with an analog-to-digital converter 8, a micro controller 9, a warning flasher 10, and flexible flat cables 11, and the flexible flat cables 11 are connected to the wires 7. (Supplementing a circuit structure among the analog-to-digital converter 8, the micro controller 9, the warning flasher 10, and the piezoelectric material layers 6).

Further, the shape memory polymer rod 4 can generate a respective deformation along with change of temperature, and the deformation generated by the outer frame constraint 5 along with change of temperature is tiny.

Further, the shape memory polymer rod 4 can generate buckling by an axial pressure under the action of the outer frame constraint 5 after temperature deformation, thus becoming a shape memory polymer buckling beam 401 which has a curved wave.

Further, the shape memory polymer buckling beam 401 can generate post-buckling along with the continuous change of the temperature, thus becoming a shape memory polymer post-buckling beam 402 which has three curved waves.

Further, a function of the electric signal generating element 2 is to convert kinetic energy released by the buckling and post-buckling changes of the shape memory polymer rod 4 into electric signals and to transmit the electric signals.

Further, the electric signal generating element 2 can achieve conversion of the kinetic energy to the electric signals by applying the piezoelectric material layers 6.

Further, the piezoelectric material layers 6 are attached to both sides of the shape memory polymer rod 4, and the lengths of the piezoelectric material layers 6 cover every position where the shape memory polymer rod 4 is in contact with the outer frame constraint 5 when the shape memory polymer rod generates the post-buckling change.

Further, the shape memory polymer buckling beam rod component 1 and the electric signal generating element 2 do not need external power supply.

A circuit connection structure of the present invention is that the electric signal generating element 2 is electrically connected to the analog-to-digital converter 8, the analog-to-digital converter 8 is electrically connected to the micro controller 9, and the micro controller 9 is electrically connected to the warning flasher 10.

Figure 2:
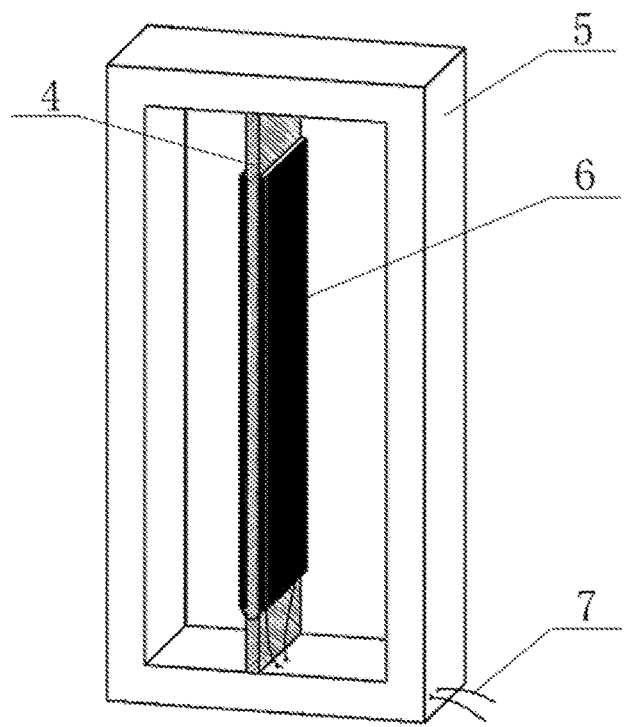
FIG. 2 is a structure diagram of a non-buckling state of a shape memory polymer buckling beam rod component in accordance with the present invention.

The use process of the structural health monitoring device is explained by taking FIG. 2 as an example, it is considered that due to the presence of the outer frame restraint 5, the head-tail distance D of the rod is kept unchanged, but the length L of the shape memory polymer rod 4 may change along with temperature, and when the structural temperature changes, it is equivalent to that the displacement (dimension$\Delta$=L−D) is generated at both ends of the rod. According to the beam buckling behavior theory controlled by the displacement$\Delta$, the displacement of the beam when each order of buckling and post-buckling behaviors occur can be predicted, and by designing a shape memory behavior of the shape memory polymer rod 4, the shape memory polymer rod 4 can generate post-buckling jumping when reaching a given certain temperature, thus making the piezoelectric material layers 6 generate electric signals, and the structural health state abnormity warning is triggered by the signal processing and structural health state abnormity warning platform 3.

By changing the geometric dimension of the outer frame constraint 5 and the shape memory behavior of the shape memory polymer rod 4, the shape piezoelectric material layers 6 can generate electric signals at different critical temperatures to meet demands of an actual engineering structure. Due to the fact that the single buckling beam can change the buckling level under a plurality of displacements, a plurality of critical temperatures can be correspondingly monitored. In addition, the form of critical temperature monitoring can also be enriched to a greater extent by a way that the rods are combined to form the shape memory polymer buckling beam rod component 1.

Figure 3:
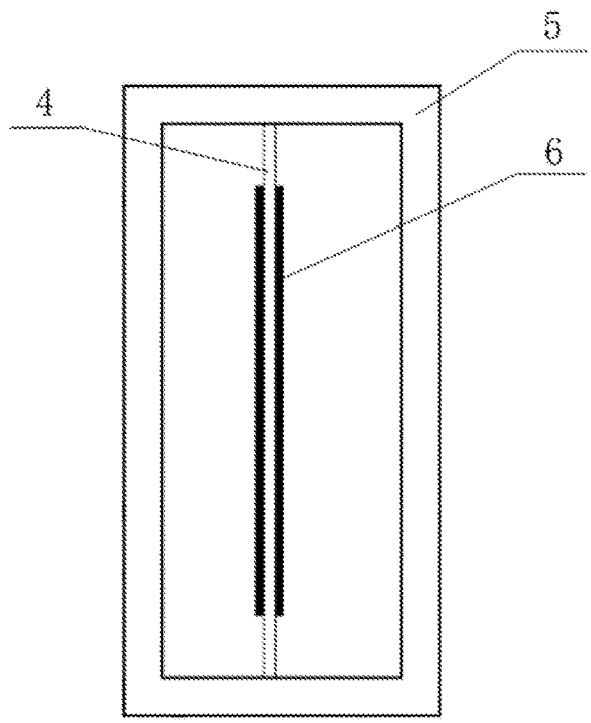
FIG. 3 is a front view of a non-buckling state of a shape memory polymer buckling beam rod in accordance with the present invention.
Figure 4:
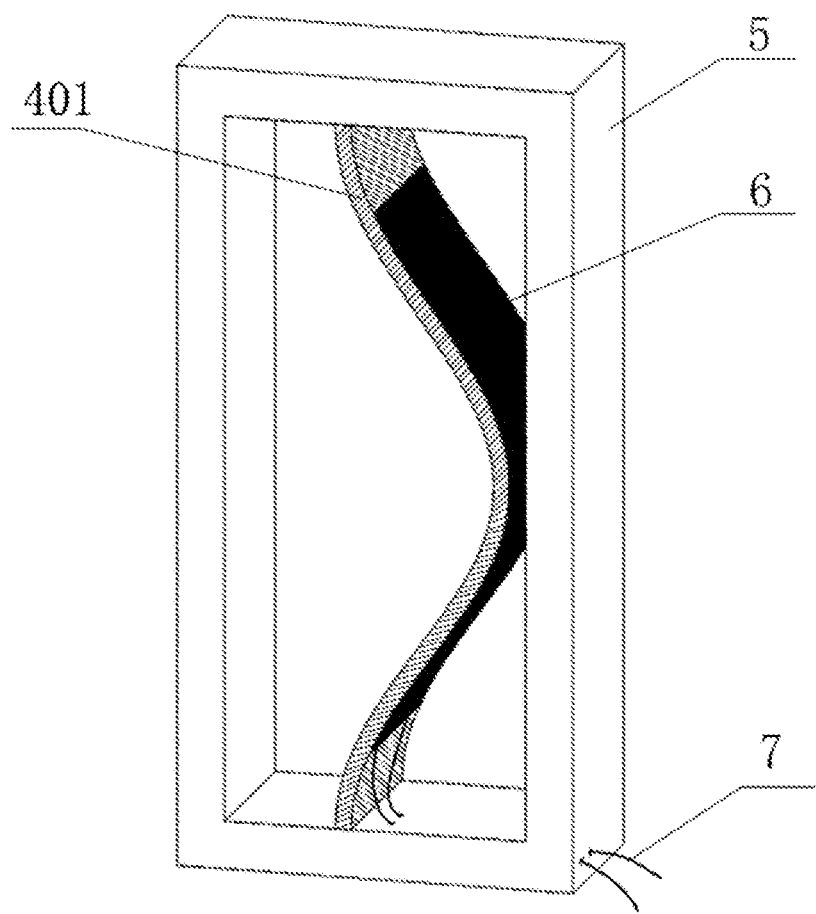
FIG. 4 is a structure diagram of a buckling state of a shape memory polymer buckling beam rod in accordance with the present invention.
Figure 5:
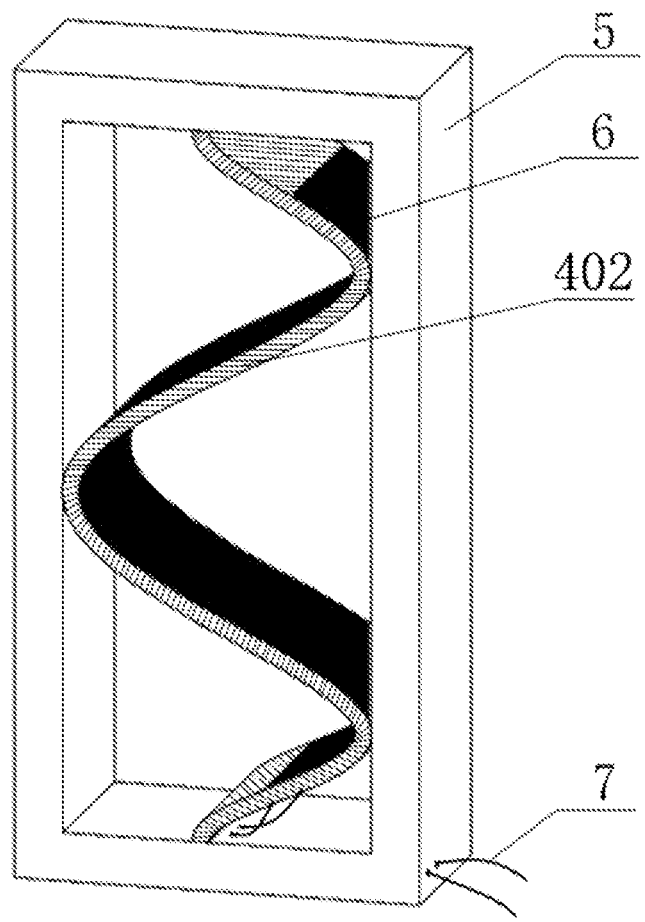
FIG. 5 is a structure diagram of a post-buckling state of a shape memory polymer buckling beam rod in accordance with the present invention.

The process of converting the shape memory polymer rod 4 from a non-buckling state into a buckling state and a post-buckling state along with change of temperature is explained by taking FIG. 3, FIG. 4, and FIG. 5 as examples.

In an initial state, the length L of the shape memory polymer rod 4 is equal to the length D of the inner side of the outer frame constraint 5, and the shape memory polymer rod 4 is free of buckling. As the temperature changes, the length L of the shape memory polymer rod 4 is increased, and the shape memory polymer rod 4 generates buckling under the action of the outer frame constraint 5. As the temperature continues to change, the length L of the shape memory polymer rod 4 continues to increase, and the shape memory polymer rod 4 generates post-buckling under the action of the outer frame constraint 5.

FIG. 1 explains and describes that the shape memory polymer structure can achieve a plurality of flexible design requirements, various assemblies are connected by flexible materials, the health monitoring demands of various structures can be achieved, and electric signals generated by various assemblies are connected through the interior of the structure, are finally exported from one point, and are conducted to an external receiving device through wires.

It should be noted that, during use, the memory polymer buckling beam rod components 1 provided by the present invention are directly buried in an engineering structure to facilitate sensing of an environment temperature.

Finally, it should be noted that the above embodiments are merely illustrative of the technical solutions of the present invention, and are not intended to limit the same. Although the present invention has been described in detail with reference to the foregoing embodiments, it should be understood by those of ordinary skill in the art that modification may be made to the technical solutions described in the foregoing embodiments, or equivalent replacement may be made to some or all of the technical features; however, the modifications or replacements do not make the essence of the corresponding technical solutions deviate from the scope of the technical solutions of various embodiments of the present invention.

A shape memory polymer structural health detection system disclosed by the present invention does not need an external power source for driving, and has high device stability and reliability, and good editability. A targeted design adjustment can be carried out based on demands of different projects and structures, and by taking a shape memory material temperature change response as an implementation method for structural health temperature monitoring, the industrial problems such as high reliability, durability requirements and the like of the structural health monitoring can be solved by combining a specific rod group structure. According to the technology, a low-frequency temperature is converted into a high-frequency buckling response, and the deformation of a variable-frequency beam is used for exciting piezoelectric material layers to generate a current, thus achieving the purpose of monitoring. In addition, a plurality of shape memory polymer materials and beams with different geometric parameters are utilized to form assemblies, and the design of a flexible structure is achieved by linking different assemblies through flexible materials, which can achieve the requirements of the specific structure design, and adapt to complex and diverse structural health monitoring demands at the same time; and the practicability of the design is greatly improved.

What is claimed is:

1. A structural health monitoring system based on a shape memory polymer, the structural health monitoring system comprising a plurality of shape memory polymer buckling beam rod components and a signal processing and structural health state abnormity warning platform; wherein each shape memory polymer buckling beam rod component comprises an outer frame constraint, a shape memory polymer rod arranged in the outer frame constraint, and an electric signal generating element arranged on the shape memory polymer rod; the electric signal generating element comprises piezoelectric material layers covering surfaces of the shape memory polymer rod, and the signal processing and structural health state abnormity warning platform is electrically connected to the piezoelectric material layers, wherein the shape memory polymer rod is able to generate a respective deformation along with temperature change, the shape memory polymer rod is able to generate buckling by an axial pressure under an action of the outer frame constraint after temperature deformation, and becomes a shape memory polymer buckling beam, the shape memory polymer buckling beam is able to generate post-buckling along with continuous change of a temperature, and becomes a shape memory polymer post-buckling beam.

2. The structural health monitoring system based on the shape memory polymer according to claim 1, wherein the signal processing and structural health monitoring abnormity warning platform is provided with an analog-to-digital converter, a micro controller, and a warning flasher.

3. The structural health monitoring system based on the shape memory polymer according to claim 1, wherein the piezoelectric material layers cover both sides of the shape memory polymer rod, and a length of each of the piezoelectric material layers covers every position where the shape memory polymer rod is in contact with the outer frame constraint when the shape memory polymer rod generates the post-buckling.

4. The structural health monitoring system based on the shape memory polymer according to claim 1, wherein the electric signal generating element further comprises wires connected to the piezoelectric material layers in a matched mode, and the wires are connected to the signal processing and structural health state abnormity warning platform.

5. The structural health monitoring system based on the shape memory polymer according to claim 4, wherein the electric signal generating element converts kinetic energy released by buckling and post-buckling of the shape memory polymer rod into electric signals and transmits the electric signals to the signal processing and structural health state abnormity warning platform.

6. The structural health monitoring system based on the shape memory polymer according to claim 2, wherein the electric signal generating element further comprises wires connected to the piezoelectric material layers in a matched mode, and the wires are connected to the signal processing and structural health state abnormity warning platform.

7. The structural health monitoring system based on the shape memory polymer according to claim 6, wherein the electric signal generating element converts kinetic energy released by buckling and post-buckling of the shape memory polymer rod into electric signals and transmits the electric signals to the signal processing and structural health state abnormity warning platform.

* * * * *